United States Patent
Paya et al.

(10) Patent No.: US 8,090,954 B2
(45) Date of Patent: Jan. 3, 2012

(54) PREVENTION OF UNAUTHORIZED FORWARDING AND AUTHENTICATION OF SIGNATURES

(75) Inventors: Cem Paya, Gainesville, FL (US); Josh Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 11/687,262

(22) Filed: Mar. 16, 2007

(65) Prior Publication Data
US 2008/0229111 A1      Sep. 18, 2008

(51) Int. Cl.
    H04L 9/32      (2006.01)
(52) U.S. Cl. .......................... 713/180; 713/176
(58) Field of Classification Search .................. 713/176, 713/157, 180
    See application file for complete search history.

(56) References Cited

U.S. PATENT DOCUMENTS

| | | | | |
|---|---|---|---|---|
| 4,868,877 | A * | 9/1989 | Fischer | 713/157 |
| 5,406,628 | A * | 4/1995 | Beller et al. | 380/30 |
| 5,633,929 | A * | 5/1997 | Kaliski, Jr. | 380/286 |
| 5,764,766 | A * | 6/1998 | Spratte | 380/262 |
| 5,825,880 | A * | 10/1998 | Sudia et al. | 713/180 |
| 6,084,965 | A | 7/2000 | Ahn et al. | 380/28 |
| 6,363,479 | B1 | 3/2002 | Godfrey et al. | 713/160 |
| 6,959,382 | B1 | 10/2005 | Kinnis et al. | 713/170 |
| 7,143,284 | B2 | 11/2006 | Wheeler et al. | 713/155 |
| 7,630,986 | B1 * | 12/2009 | Herz et al. | 1/1 |
| 7,933,950 | B1 * | 4/2011 | Barton et al. | 709/203 |
| 2004/0083365 | A1 * | 4/2004 | Renier et al. | 713/168 |
| 2004/0236953 | A1 | 11/2004 | Merenne et al. | 713/182 |
| 2005/0169461 | A1 | 8/2005 | Canard et al. | 380/28 |
| 2005/0204129 | A1 | 9/2005 | Sudia et al. | 713/158 |
| 2005/0246544 | A1 * | 11/2005 | Moore et al. | 713/178 |
| 2005/0257045 | A1 | 11/2005 | Bushman et al. | 713/156 |
| 2005/0273615 | A1 | 12/2005 | Silverbrook et al. | 713/176 |
| 2006/0100011 | A1 | 5/2006 | Morrow et al. | 463/29 |
| 2006/0156007 | A1 | 7/2006 | Stephens-Doll | 713/176 |
| 2006/0294368 | A1 | 12/2006 | Adams et al. | 713/156 |

OTHER PUBLICATIONS

Menezes et al. "Handbook of applied cryptography" 1997 CRC Press, pp. 3-7.*
Leibzon, W., "Email Security Anti-Spoofing Protection with Path and Cryptographic Authentication Methods", 2005, http://www.metasignatures.org/documents/Path_and_Cryptographic_Authentication-limited101.pdf, 15 pages.
"Security and Privacy Considerations for the OASIS Security Assertion Markup Language (SAML)", Editors: Chris McLaren, Netegrity, http://www.oasis-open.org/committees/security/docs/cs-sstc-sec-consider-00.doc, Apr. 19, 2002, 25 pages.
"Distributed Security: Examining Cryptography and Authentication", 2007 Microsoft Corporation, http://www.microsoft.com/technet/archive/security/prodtech/windows/iis/ch11ce.mspx, 28 pages.

* cited by examiner

Primary Examiner — Kambiz Zand
Assistant Examiner — Michael Guirguis
(74) Attorney, Agent, or Firm — Woodcock Washburn LLP (57) ABSTRACT

A forwarding signature comprises a modified digital signature, modified using a predetermined parameter between a sender and an intended recipient. An intended recipient of the forwarding signature can verify that the forwarding signature corresponds to the message, but, can neither derive the original digital signature nor generate a new forwarding signature for a different parameter. Generation and verification of the forwarding signature is accomplished with access to the public key of a public/private cryptographic key pair, the original signed message, and the predetermined parameter. Access to the private key is not needed.

20 Claims, 5 Drawing Sheets

PREVENTION OF UNAUTHORIZED FORWARDING AND AUTHENTICATION OF SIGNATURES

TECHNICAL FIELD

The technical field relates generally to computer processing and more specifically to authentication.

BACKGROUND

Imagine the following scenario involving three parties: Alice, Bob and Carol. Alice cryptographically signs a message and gives the signed message to Bob. Bob wants to prove to a third party, Carol, that he possesses the message signed by Alice, but does not want to disclose the original signature to Carol. This scenario occurs often. It is not uncommon for an application to request that a service forward a digitally signed message from a user to another entity. For example, during online authentication: a service such as WINDOWS LIVE ID issues digitally signed authentication tickets in a format such as the Security Assertion Markup Language (SAML) to a user. The user presents the ticket to a relying party ("RP") as proof of identity. The relying party, in turn, may need to invoke another service, which requires proof that the service is being invoked on behalf of the original user. Accordingly the relying party forwards the ticket. As another example, a user can authenticate his/her self to XBOX LIVE using a signed ticket from the WINDOWS LIVE ID service. XBOX LIVE in turn can call a third-party to request an action (e.g., call a voice carrier to provide voice communication between players), and forwards the ticket to the third party. The third party can verify that the action is on behalf of the original user by validating the signed ticket. A problem however is that the third party (e.g., the voice-carrier), using the signature, can impersonate the user. For example, the third party could make similar requests to other services on behalf of the user or in some cases, even impersonate the user back to XBOX LIVE. Thus, requesting a service to forward the signed message requires that the recipient of the signed message be trusted not to misuse or reuse the signed message.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mechanism is provided that allows proving possession of a signed message without revealing the original signature. The mechanism prevents using a signed message for impersonation. A signature is modified, also referred to as tweaked, to incorporate a predetermined parameter that allows the recipient of the signature to verify the signed message using the predetermined parameter. The recipient, however, can not recover the original signature. Further, the recipient can not generate another tweaked signature using another tweak parameter.

BRIEF DESCRIPTION OF THE DRAWINGS

The foregoing summary, as well as the following detailed description, is better understood when read in conjunction with the appended drawings. For the purpose of illustrating proving possession of a signed message without revealing the original signature, there is shown in the drawings exemplary constructions thereof; however, proving possession of a signed message without revealing the original signature is not limited to the specific methods and instrumentalities disclosed.

DETAILED DESCRIPTION OF ILLUSTRATIVE EMBODIMENTS

Digitally signed messages are modified, or tweaked, such that an intended recipient of the tweaked signed message can verify the message, but can neither use the message for impersonation nor generate a new tweaked message. A first entity can modify the signature utilizing a predetermined parameter, referred to herein as a tweak parameter. A recipient, having knowledge of the tweak parameter, of the signed message (which includes the message and a signature) can verify the signature utilizing the tweak parameter. The recipient can not recover the original un-tweaked signature. And, given a tweaked signature, the recipient can not generate another tweaked signature (forwarding signature) utilizing another tweak parameter.

Figure 1:
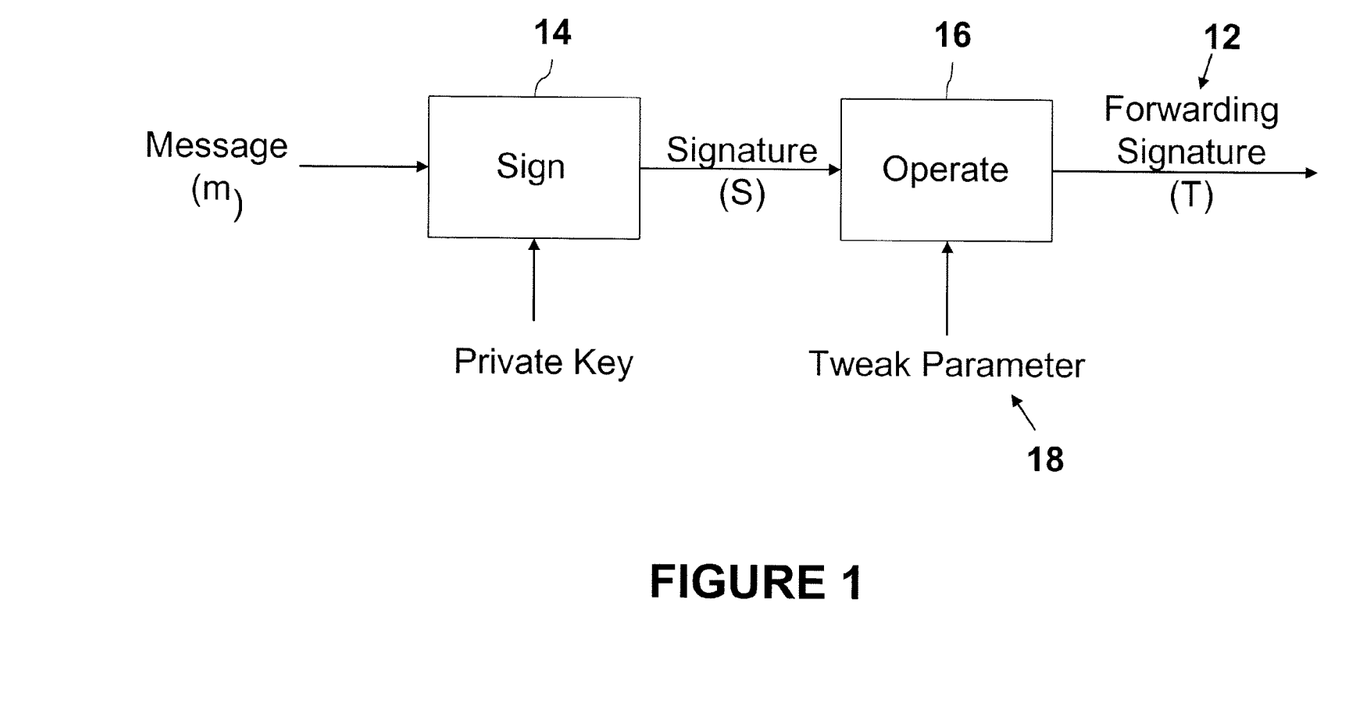
FIG. 1 is a block diagram illustrating an example generation of a forwarding signature.

FIG. 1 is a block diagram illustrating an example generation of a forwarding signature 12. A message, m, is signed at block 14. The message can comprise a clear text message such as, for example, a user name, an ID, a machine code, or any appropriate message. The message can comprise a cryptographic hash value indicative of the clear text message. A hash value of a message is the result of operating on the message with a hash function. Hash functions are known in the art. A hash function is a function that transforms a variable-size input into a fixed size value. In this application, hash functions are typically one-way, meaning that it is impracticable to determine the input value from the output (transformed) value. Hash functions may also be collision resistant. That is, it is difficult to find two different inputs that map to the same output value. Providing the same input to a hash function will provide the same output. A slight change, however, in the input typically results in a considerable change in the output. Example hash functions include MD5, SHA-1, SHA-224, SHA-256, SHA-384, and SHA-512.

In an example embodiment, the message, m, is signed at block 14. The message, m, can be signed in accordance with any appropriate signing technique. In an example embodiment, the message, m, is signed utilizing public key cryptography. Public key cryptography is known in the art. Typically, public key cryptography utilizes a pair of keys, such as a private key and a public key. The private key is typically guarded, and the public is typically made available to others. Knowledge of the public key does not imply knowledge of the private key. In a common scenario, a message is signed with the private key and the signature is verified with the public key.

The message, m, is signed utilizing a signature algorithm that does not necessarily require encryption and/or decryption. Generally, the signature algorithm incorporates two functions: a signing function and a verification function. The verification function provides an indication that the signature is valid. In an example embodiment, the message, m, is encrypted by block 14 utilizing a private key of a public/private cryptographic key pair. The result of encrypting the message utilizing the private key at block 14 is the signature, S. The signature, S, is operated on by block 16, utilizing the tweak parameter 18. In an example embodiment, the tweak parameter 18 is a predetermined parameter known by a sender and an intended recipient. The tweak parameter 18 can comprise any appropriate value. The result of operating on the signature, S, utilizing the tweak parameter 18 by block 16 results in the forwarding signature, T, 12.

Figure 2:
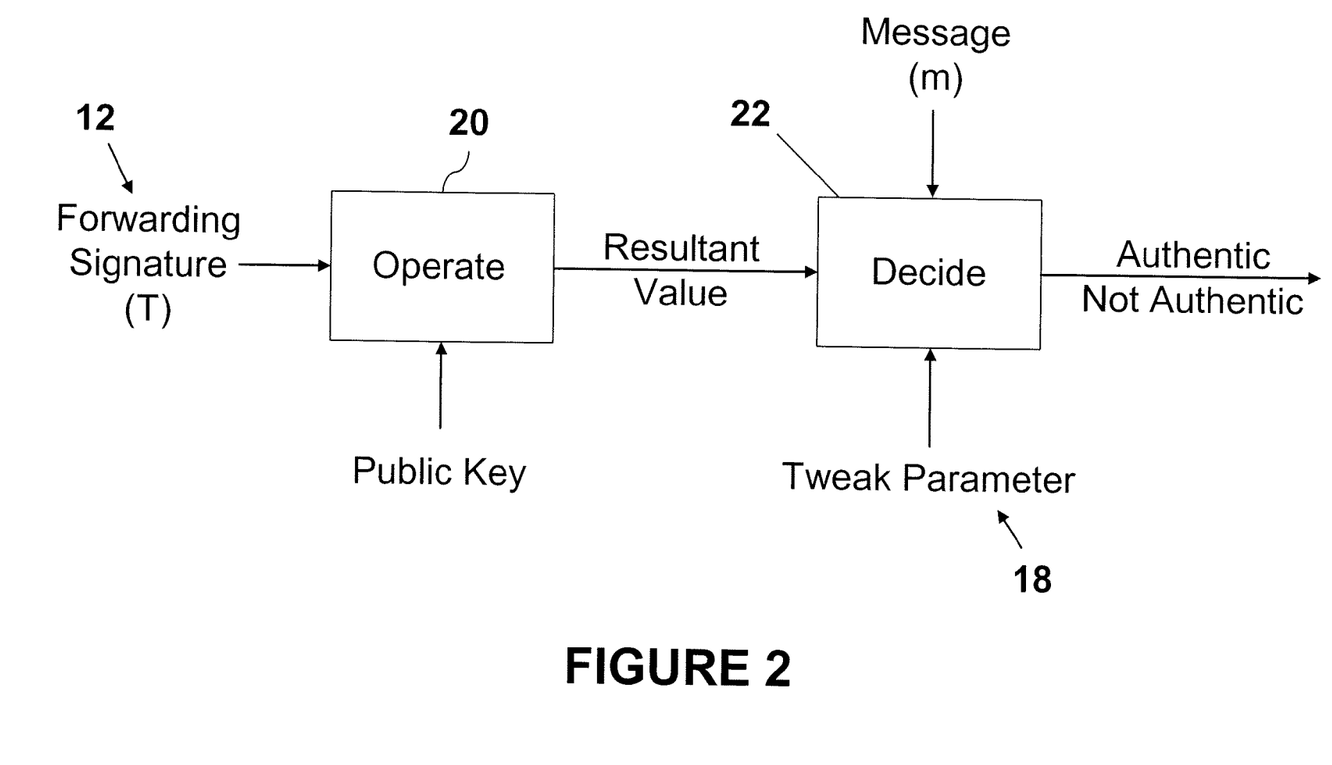
FIG. 2 is a block diagram of an example illustration of authenticating a forwarding signature.

FIG. 2 is a block diagram of an example illustration of authenticating a forwarding signature 12. The forwarding signature 12 and the message, m, are provided to an intended recipient. Upon receipt, the forwarding signature is operated on by block 20 utilizing the public key of the public/private cryptographic key pair. The resulting value of operating on the forwarding signature 12 by block 20 is provided to the decision block 22. The resultant value is processed by decision block 22 to determine if the decrypted forwarding signature is authentic or not authentic. The resultant value is processed by the decision block 22 utilizing the message, m, and the tweak parameter 18.

Figure 3:
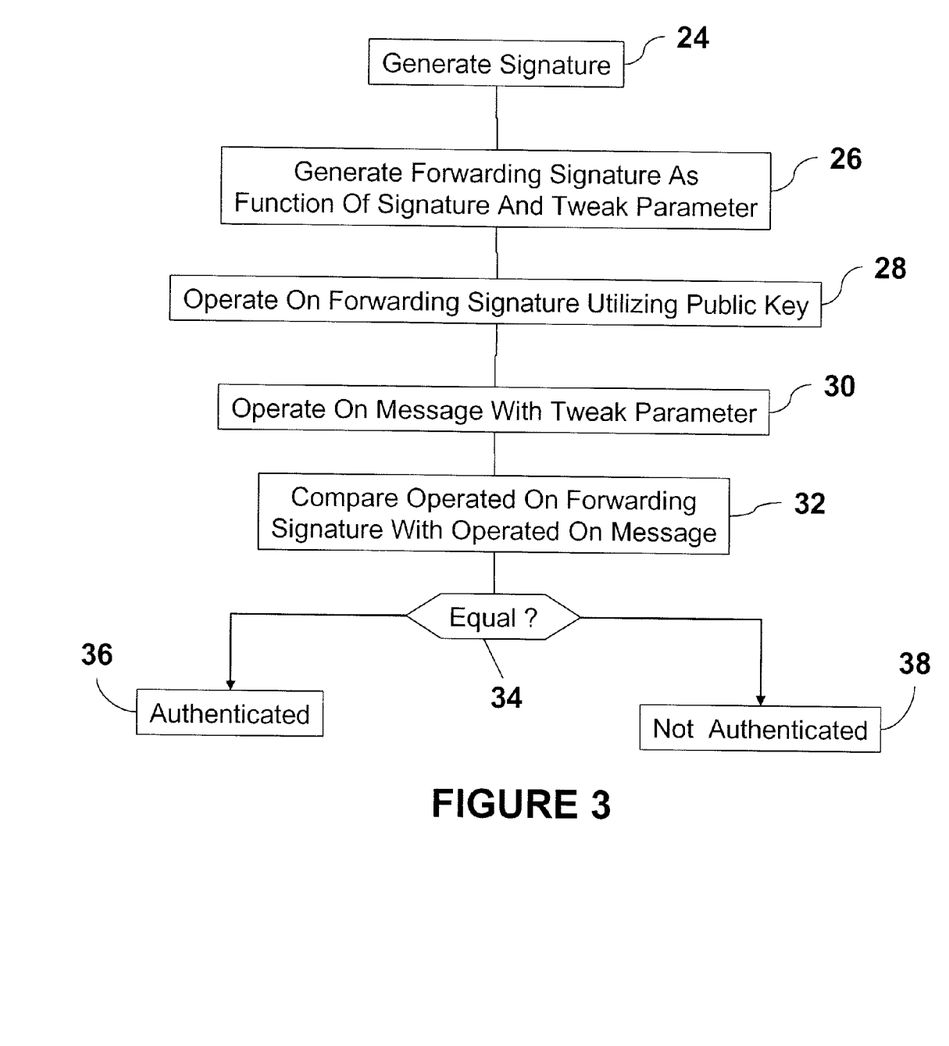
FIG. 3 is a flow diagram of an example authentication process using a forwarding signature.

FIG. 3 is a flow diagram of an example authentication process using a forwarding signature. In the example process depicted in FIG. 3, RSA public key cryptographic techniques are utilized. It is to be understood however, that the authentication process is not limited thereto, and that any appropriate public key cryptographic techniques can be utilized.

A signature of the message is determined at step 24. The signature can be determined in any appropriate manner. For example, utilizing RSA public key cryptography, a public key comprises an exponent value and a modulus value, and the private key comprises an exponent value and the modulus value. As described herein, the public key exponent value is referred to as "e", the private key exponent value is referred to as "d", and the modulus value is referred to as "N". Accordingly, in an example embodiment, the signature is generated in accordance with equation (1) below.

$$S = m^d \bmod N, \text{ where} \tag{1}$$

S represents the signature, m represent the message, d represents the exponent value of the private key, mod represents the modular reduction function, and N represents an integer value. In accordance with the RSA cryptographic system, N represents a product of two prime numbers. The message m may be the original message or a cryptographic hash thereof.

The forwarding signature is generated at step 26. As described above, the forwarding signature is generated utilizing the predetermined tweak parameter. The value of the tweak parameter is agreed upon by the forwarder and the recipient. The tweak parameter can be generated in any appropriate manner, such as one side determining the value thereof or both sides negotiating the value thereof, for example.

In an example embodiment, a cryptographic hash value of the tweak parameter and the signature are used to generate the forwarding signature in accordance with equation (2) below.

$$T = S^{Hash(p)} \bmod N, \text{ where} \tag{2}$$

T represents the forwarding signature, S represents the signature, p represents the tweak parameter, Hash(p) represents a hash value indicative of p, mod represents the modular reduction function, and N represents an integer value. In essence, the signature, S, is encrypted utilizing the Hash(p) as an RSA public-exponent.

The message, m, and the forwarding signature, T, are provided to an intended recipient. The intended recipient analyzes the forwarding signature, T, utilizing the message, m, the public key, and the tweak parameter, p, to determine if the forwarding signature is authentic. The forwarding signature is operated on at step 28. In an example embodiment, the forwarding signature is operated on by raising the forwarding signature to a power equal to the public key exponent value, for example in accordance with formula (3) below.

$$T^e \bmod N, \text{ where} \tag{3}$$

T represents the forwarding signature, and e represents the exponent value of the public key. The value obtained at step 28 is used to authenticate the forwarding signature. The message is operated on at step 30 utilizing the tweak parameter, and the resulting value is compared with the value obtained at step 28 to authenticate the tweaked parameter. At step 30, in an example embodiment, the message is raised to a power equal to a hash value indicative of the tweak parameter p, for example in accordance with formula (4) below.

$$m^{Hash(p)} \bmod N, \text{ where} \tag{4}$$

m represents the message, Hash(p) represents a hash value indicative of p, mod represents the modular reduction function, and N represents an integer value.

At step 32 the value resulting from step from step 28 is compared with the value resulting from step 30. In an example embodiment, the value obtained from formula (3) is compare to the value obtained from formula (4). If the values are determined to be equal (step 34), the forwarding signature is determined to be authentic at step 36. If the values are determined to be not equal (step 34), the forwarding signature is determined to be not authentic at step 38.

Comparing the value obtained from formula (3) with the value obtained from equation (4) to authenticate the tweak signature is equivalent to determining of formula (3) is equal to formula (4), as depicted in equation (5) below.

$$T^e = m^{Hash(p)} \bmod N. \tag{5}$$

To show that equation (5) is true, using equation (2), it can be shown that $T^e$ can be rewritten as shown in equation (6) below.

$$T^e = (S^{Hash(p)})^e \bmod N \tag{6}$$

Rearranging the exponents in equation (6) results in equation (7) below.

$$T^e = (S^e)^{Hash(p)} \bmod N \tag{7}$$

And, $S^e$ results in the message, m; thus yielding equation (5):

$$T^e = m^{Hash(p)} \bmod N$$

The ability to generate and verify the forwarding signature with access to only the original message, the public key, and the tweak parameter; and without knowledge of the private key has many applications. For example, this authentications technique is applicable to federated authentication. Assume an identity provider creates a signed identity assertion (referred to as a "service ticket") for a user. The user can use the service ticket to authenticate to a website, W. The website W can call another service S to take action on behalf of the user. S requires proof that the call is being made on behalf of the user. The service ticket could be forwarded to S, but this could allow S to make a similar call to another service S2 or even impersonate Alice back to W, violating the principle of least privilege. Utilizing the forwarding signature, however, W tweaks the signature on the service ticket using a unique identifier for the service S (e.g., the name of S or other unique identifier). S verifies the forwarding signature using the same agreed upon tweak parameter. S can not impersonate the user at W service because it can not recover the original signature associated with the service ticket. Neither can S call another service S2 on behalf of the user, because S2 would expect to receive a ticket modified with different parameter.

Another example application of a forwarding signature applies to online authentication. Typically, principals receive a different authentication token for each relying party. This leads to additional load for the identity provider, as the act of authentication to each relying party requires an additional transaction. In addition privacy is adversely impacted because the identity provider must know which service the user has authenticated to. Using the forward-signature improves privacy. Instead of embedding an identifier for the relying party inside the ticket, the identity provider issues a signed generic ticket. The user tweaks the signature with an identifier for the intended relying party (such as name of the website) creating a ticket that is only usable at that website. In addition, the transaction load on the relying party can be reduced by obtaining a single ticket and deriving multiple tweaked tickets from it for different relying parties. In an example embodiment, the tweaked signatures are collusion resistant, thus avoiding duplicate tweak signature values.

Yet another application of the forwarding signature is anti-spamming. Email can be authenticated using digital signing. Anti-spam schemes such as Domain-Keys Identified Mail (DKIM) seek to establish the origin of emails by digital signatures. These schemes have a problem when dealing with message forwarding. If each node forwarding the message were to keep the signature intact, a recipient could take that message and create forged messages that appear to have traveled a different route. Utilizing forwarding signatures, each node in the forwarding path can tweak the signature using the identity of the next node as a tweak parameter. Each recipient along the way, given the public key of the original sender and sequence of nodes the message traveled through, can verify that the forwarding signature is correct with respect to the sequence of forwarding nodes. No recipient downstream can inject a new message into the system that carries the original signature but appears to have traveled along a different path to the recipient.

Figure 4:
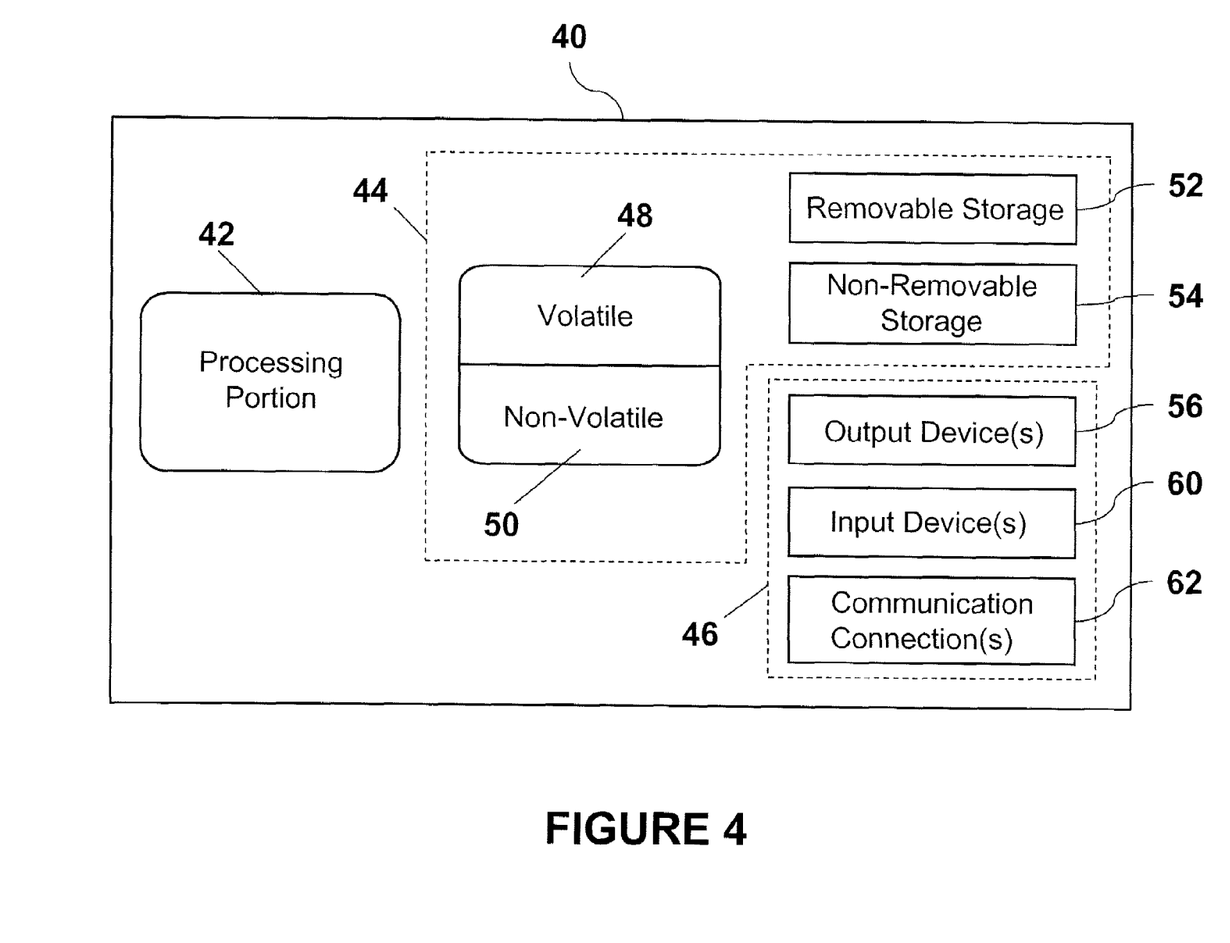
FIG. 4 is a diagram of an exemplary processor for generating and/or authenticating a forwarding signature.

FIG. 4 is a diagram of an exemplary processor 40 for generating and/or authenticating a tweaked (or forwarding) signature. The processor 40 comprises a processing portion 42, a memory portion 44, and an input/output portion 46. The processing portion 42, memory portion 44, and input/output portion 46 are coupled together (coupling not shown in FIG. 4) to allow communications therebetween. The input/output portion 46 is capable of providing and/or receiving components utilized to generate and/or authenticate and forwarding signature as described above.

The processing portion 42 is capable of generating and/or authenticating a forwarding signature as described above. For example, the processing portion 42 is capable of generating a digital signature utilizing the private key of a public/private cryptographic key pair, generate a forwarding signature utilizing a tweak parameter and the digital signature, operate on the forwarding signature utilizing the public key, operate on a message with the tweak parameter, compare values, and determine if a forwarding signature is authentic in accordance with the comparison.

The processor 40 can be implemented as a client processor and/or a server processor. In a basic configuration, the processor 40 can include at least one processing portion 42 and memory portion 44. The memory portion 44 can store any information utilized in conjunction with generating and/or authenticating a forwarding signature. Depending upon the exact configuration and type of processor, the memory portion 44 can be volatile (such as RAM) 48, non-volatile (such as ROM, flash memory, etc.) 50, or a combination thereof. The processor 40 can have additional features/functionality. For example, the processor 40 can include additional storage (removable storage 52 and/or non-removable storage 54) including, but not limited to, magnetic or optical disks, tape, flash, smart cards or a combination thereof. Computer storage media, such as memory portion 44, 48, 50, 52, and 54, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 40. Any such computer storage media can be part of the processor 40.

The processor 40 can also contain communications connection(s) 44 that allow the processor 40 to communicate with other devices, for example. Communications connection(s) 62 is an example of communication media. Communication media typically embody computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media. The processor 40 also can have input device(s) 60 such as keyboard, mouse, pen, voice input device, touch input device, etc. Output device(s) 56 such as a display, speakers, printer, etc. also can be included.

Figure 5:
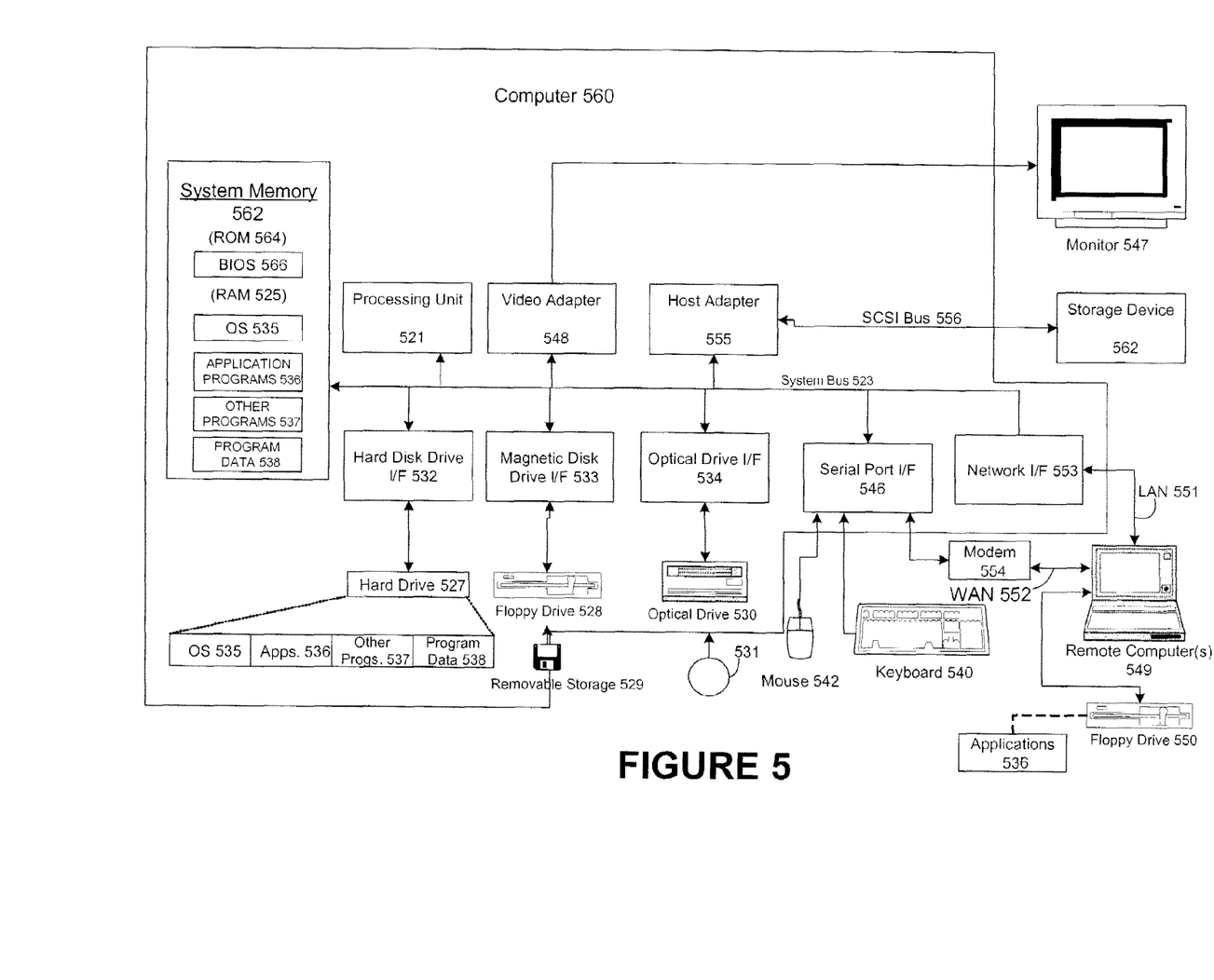
FIG. 5 is a depiction of an example suitable computing environment in which a forwarding signature can be implemented.

FIG. 5 and the following discussion provide a brief general description of an example suitable computing environment in which a forwarding signature can be implemented. Although not required, various aspects of forwarding signatures can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of forwarding signatures can be practiced with other computer system configurations, including hand held devices, multi processor systems, microprocessor based or programmable consumer electronics, network PCs, minicomputers, mainframe computers, and the like. Further, the provision of functionality via forwarding signatures also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with forwarding signatures as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 5, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non-volatile storage of computer readable instructions, data structures, program modules, and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors, security or fire alarm systems, and other sources of information.

Program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 5 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 5. The logical connections depicted in FIG. 5 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of forwarding signatures are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing the provision of functionality forwarding signatures, or certain aspects or portions thereof, can take the form of program code (i. e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing functionality via forwarding signatures.

The program(s) can be implemented in assembly or machine language, if desired. In any case, the language can be a compiled or interpreted language, and combined with hardware implementations. The methods and apparatuses for implementing forwarding signatures also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of forwarding signatures. Additionally, any storage techniques used in connection with forwarding signatures can invariably be a combination of hardware and software.

While forwarding signatures have been described in connection with the example embodiments of the various figures, it is to be understood that other similar embodiments can be used or modifications and additions can be made to the described embodiments for performing the same functions of forwarding signatures without deviating therefrom. Therefore, forwarding signatures as described herein should not be limited to any single embodiment, but rather should be construed in breadth and scope in accordance with the appended claims.

What is claimed:

1. An authentication method comprising:
   receiving in a processor of a receiving node, a message and a forwarding signature (T), wherein:
   the forwarding signature has been generated in a transmitting node by applying a predetermined tweak parameter (p) to a confidential signature (S), the predetermined tweak parameter having a value that is selected in the transmitting node; and
   wherein the confidential signature has been generated by signing the message with a private key of a public/private key pair;
   operating on the forwarding signature to generate a first value, wherein the forwarding signature is operated on utilizing a public key of the public/private key pair;
   operating on the message to generate a second value, wherein the message is operated on utilizing the predetermined tweak parameter;
   comparing the first value and the second value; and
   authenticating the message in accordance with a result of comparing the first value and the second value.

2. A method in accordance with claim 1, wherein the predetermined tweak parameter that is selected in the transmitting node is agreed to by the receiving node.

3. A method in accordance claim 1, wherein:
   the public key comprises an exponent value, and
   operating on the forwarding signature comprises raising the signature to a power equal to the exponent value.

4. A method in accordance with claim 1, wherein:
   operating on the message comprises raising the message to a power equal to the predetermined tweak parameter modulo an integer value.

5. A method in accordance claim 1, wherein:
   the confidential signature (S) is generated in accordance with a formula:
   $S = m^d \bmod N$, wherein:
   m represents the message;
   d represent a exponent value of the private key; and
   N represents an integer value; and
   the forwarding signature (T) is generated in accordance with a formula:
   $T = S^{Hash(p)} \bmod N$, wherein:
   p represents the predetermined tweak parameter.

6. A method in accordance with claim 5, wherein:
   the forwarding signature is operated on in accordance with a formula:
   $T^e \bmod N$, wherein e represents an exponent parameter of the public key; and
   the message is operated on in accordance with a formula: $m^{Hash(p)} \bmod N$.

7. An authentication system comprising:
   an input device of a receiving processor node configured to receive a message and a forwarding signature, wherein:

the forwarding signature has been generated in a transmitting processor node by applying a predetermined tweak parameter (p) to a confidential signature (s), the predetermined tweak parameter having a value that is determined and generated in the transmitting processor node; and wherein the confidential signature has been generated by signing the message with a private key of a public/private key pair;

a processing unit coupled to the input device, the processing unit configured to:

operate on the forwarding signature to generate a first value, wherein the forwarding signature is operated on utilizing a public key of the public/private key pair;

operate on the message to generate a second value, wherein the message is operated on utilizing the predetermined tweak parameter;

compare the first value and the second value; and authenticate the message in accordance with a result of comparing the first value and the second value.

8. A system in accordance with claim 7, wherein the predetermined tweak parameter that is determined and generated in the transmitting processor node is agreed to by the receiving processor node.

9. A system in accordance claim 7, wherein:
the public key comprises an exponent value, and
operating on the forwarding signature comprises raising the signature to a power equal to the exponent value.

10. A system in accordance claim 7, wherein:
the confidential signature (S) is generated in accordance with a formula:
$S=m^d$ mod N, wherein:
m represents the message;
d represent a exponent value of the private key; and
N represents an integer value; and
the forwarding signature (T) is generated in accordance with a formula:
$T=S^{Hash(p)}$ mod N, wherein:
p represents the predetermined parameter.

11. A system in accordance with claim 10, wherein:
the forwarding signature is operated on in accordance with a formula:
$T^e$ mod N, wherein e represents an exponent parameter of the public key; and
the message is operated on in accordance with a formula: $m^{Hash(p)}$ mod N.

12. A computer-readable storage medium that is not a transient signal, the computer-readable storage medium having stored thereon computer-executable instructions for performing authentication by performing the steps of:

receiving in a first node, a message and a forwarding signature (T), wherein:

the forwarding signature has been generated in a second node by applying a predetermined tweak parameter (p) to a confidential signature (S), the predetermined tweak parameter having a value that is determined and generated in the second node; and wherein the confidential signature has been generated by signing the message with a private key of a public/private key pair;

operating on the forwarding signature to generate a first value, wherein the forwarding signature is operated on utilizing a public key of the public/private key pair;

operating on the message to generate a second value, wherein the message is operated on utilizing the predetermined tweak parameter;

comparing the first value and the second value; and authenticating the message in accordance with a result of comparing the first value and the second value.

13. A computer-readable storage medium in accordance with claim 12, wherein the predetermined tweak parameter is known to both a sender and a recipient of the message.

14. A computer-readable storage medium in accordance claim 12, wherein:
the public key comprises an exponent value, and
operating on the forwarding signature comprises raising the signature to a power equal to the exponent value.

15. A computer-readable storage medium in accordance claim 12, wherein:
operating on the message comprises raising the message to a power equal to the predetermined tweak parameter modulo an integer value.

16. A computer-readable storage medium in accordance claim 12, wherein:
the confidential signature (S) is generated in accordance with a formula:
$S=m^d$ mod N, wherein:
m represents the message;
d represent a exponent value of the private key; and
N represents an integer value; and
the forwarding signature (T) is generated in accordance with a formula:
$T=S^{Hash(p)}$ mod N, wherein:
p represents the predetermined parameter; and
the forwarding signature is operated on in accordance with a formula:
$T^e$ mod N, wherein e represents an exponent parameter of the public key; and
the message is operated on in accordance with a formula: $m^{Hash(p)}$ mod N.

17. A method in accordance with claim 1 wherein the predetermined tweak parameter comprises an identity of the receiving node in the form of a name of a first website, and wherein the predetermined tweak parameter constitutes a first tweaked ticket usable only at the first website.

18. A method in accordance with claim 17 further comprising:
using the first tweaked ticket to derive a plurality of tweaked tickets.

19. A method in accordance with claim 1 further comprising:
tweaking the forwarding signature received at the receiving node by applying a second tweak parameter comprising an identity of a second node.

20. A method in accordance with claim 19 further comprising:
receiving at the second node, the forwarding signature upon which the second tweak parameter has been applied; and
verifying at the second node, that the forwarding signature has propagated in sequence through the first and the second nodes.

* * * * *